United States Patent [19]

Rhett

[11] 4,268,298
[45] May 19, 1981

[54] MOLTEN GLASS FEEDING BOWL

[75] Inventor: Chester K. Rhett, Bainbridge Island, Wash.

[73] Assignee: Maul Technology Corporation, Millville, N.J.

[21] Appl. No.: 854,940

[22] Filed: Nov. 25, 1977

[51] Int. Cl.³ ............................ C03B 7/06; C03B 7/08
[52] U.S. Cl. ...................................... 65/327; 65/128; 65/DIG. 4
[58] Field of Search ........... 65/327, 128, 136, DIG. 4, 65/326; 13/6

[56] References Cited

U.S. PATENT DOCUMENTS

| | | | |
|---|---|---|---|
| 1,680,543 | 8/1928 | Howard | 65/327 X |
| 1,853,842 | 4/1932 | Bates et al. | 65/128 |
| 1,999,744 | 4/1935 | Wadman | 65/327 X |
| 3,145,246 | 8/1964 | Augsburger | 65/327 X |
| 3,554,727 | 1/1971 | Stevenson | 65/327 |
| 3,580,713 | 5/1971 | Schirm et al. | 65/327 |
| 3,689,679 | 9/1972 | Niwa et al. | 65/327 X |

Primary Examiner—Richard V. Fisher
Attorney, Agent, or Firm—Seidel, Gonda, Goldhammer & Panitch

[57] ABSTRACT

The molten glass feeding bowl has two parallel sides with a third side being generally perpendicular thereto. Electrodes for heating glass within the bowl extend through aligned holes in the side walls of the refractory bowl and metal housing. The bowl can accommodate electrodes along its parallel side walls and along a front wall depending upon the operative position of the shear mechanism which may extend along the center line of the bowl or to either side of the center line.

7 Claims, 2 Drawing Figures

MOLTEN GLASS FEEDING BOWL

BACKGROUND

A typical molten glass feeding bowl is generally semicircular and includes a refractory bowl, a metal housing around the bowl and insulation therebetween. For example, see U.S. Pat. No. 1,680,543. It is conventional to provide a plurality of electrical heaters between the metal housing and the refractory bowl for controlling localized heating of molten glass within the bowl.

Modern construction of shears create a problem in application of heat to glass within the bowl due to the fact that the shears must be positionable through an arc of 180° so as to be properly orientated with respect to gob handling equipment which receives gobs of glass cut by the shears after discharge through an orifice ring of the bowl. Another problem with prior art devices such as disclosed in said patent is the inefficiency of heat transmission resulting from the fact that heat is transmitted from heaters through a refractory bowl to the glass. These and other problems are solved by the present invention.

SUMMARY OF THE INVENTION

The molten glass feeder of the present invention includes a metal housing, a refractory bowl within the housing, and insulation therebetween. The metal housing differs from the metal housing of prior feeders in that it is provided with parallel side walls each containing a plurality of holes extending therethrough. The refractory bowl differs from prior art feeders in that it has parallel side walls. One or both of the parallel side walls of the bowl has a hole extending therethrough at an elevation above the bottom wall of the bowl. Each of the holes in a side wall of the bowl is aligned with a hole in the side wall of the housing. The number of holes in the bowl will be less than the number of holes in the housing. An electrode extends through the sets of aligned holes and projects into the bowl.

The feeder of the present invention, like prior art feeders, is generally U-shaped. However, the feeder of the present invention is characterized by having straight sides and a straight front wall generally perpendicular to the side walls. When the gob shears are disposed to one side of the feeder, electrodes are provided in the opposite side wall and in the front wall. When the gob shears project outwardly from the front wall of the feeder, electrodes will be used in the opposite side walls of the feeder. The number of location of electrodes used is dependent upon the angular disposition of the gob shears with respect to the feeder.

It is an object of the present invention to provide a novel molten glass feeder which provides for improved efficiency in heating molten glass within the feeder while utilizing electrode positions which are a function of the disposition of a gob shear with respect to the feeder.

It is another object of the present invention to provide a novel molten glass feeder having parallel side walls interconnected by a front wall perpendicular thereto.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
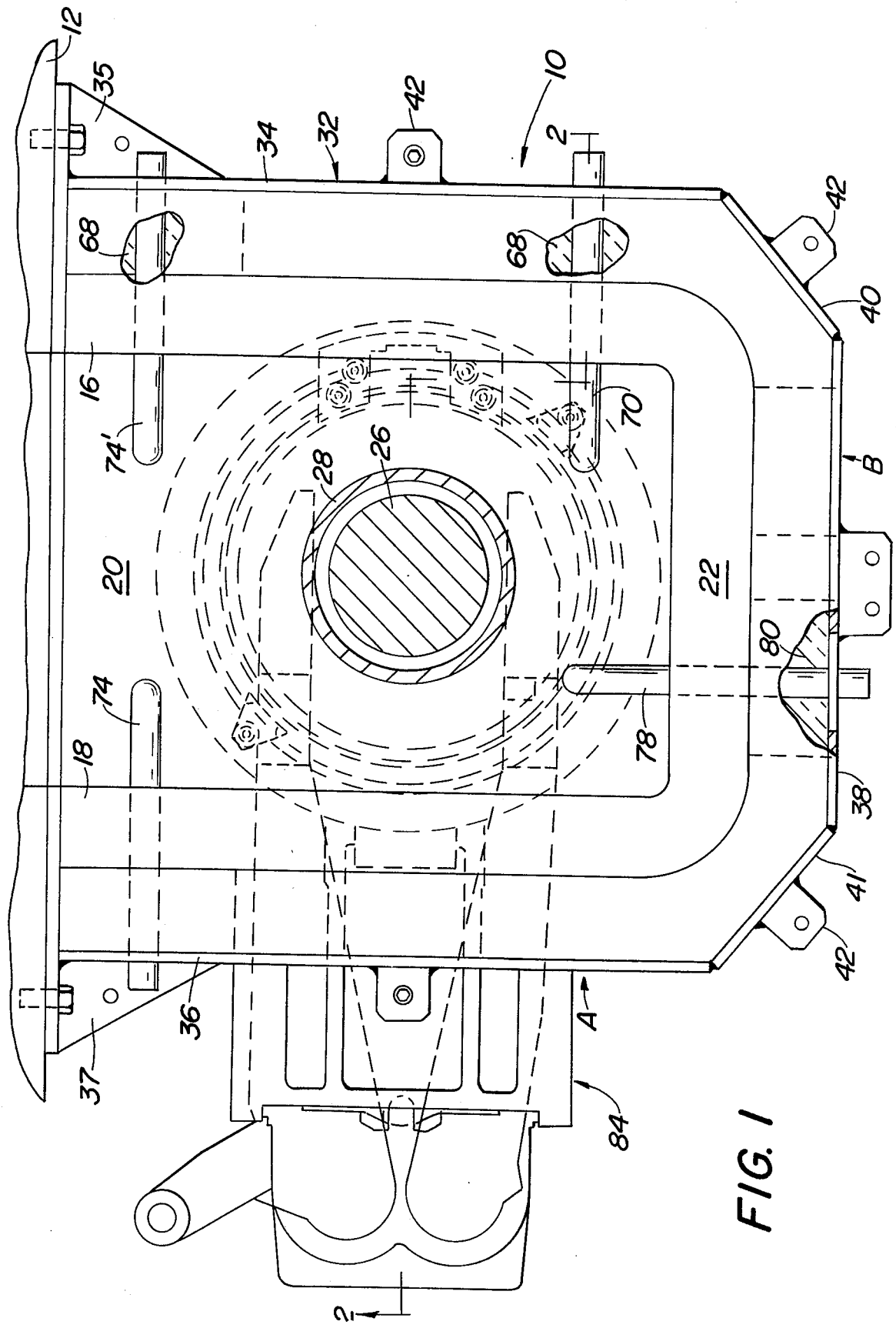
FIG. 1 is a plan view of a feeder in accordance with the present invention.

Referring to the drawings in detail, wherein like numerals indicate like elements, there is shown in FIG. 1 a top plan view of a molten glass feeder in accordance with the present invention designated generally as 10. The feeder 10 is generally U-shaped in plan view with its open end bolted to a forehearth 12 which may be of conventional construction but preferably is of the type disclosed in U.S. Pat. No. 4,029,488.

The feeder 10 includes a refractory bowl 14 which is open at the top, open at the end adjacent the forehearth 12, and has parallel viscosity disposed side walls 16 and 18 extending upwardly from a bottom wall 20. Bowl 14 has a vertically disposed front wall 22 which is straight and perpendicular to side walls 16, 18.

The bottom wall 20 of the bowl 14 is thicker than the walls 16, 18, 22 and provided with a centrally disposed orifice 24 for discharge of molten glass as a stream. A conventional plunger 26 and surrounding tube 28 are vertically adjustable in a conventional manner and extend upwardly through a conventional roof structure 30. Vertical adjustment of the plunger 26 and tube 28 controls the rate of flow of molten glass stream from the bowl 14. The significance of having straight side and front walls of the bowl 14 will be made clear hereinafter.

The feeder 10 includes a metal housing 32 around the bowl 14. The housing 32 includes straight vertically disposed side walls 34 and 36 parallel to one another. Wall 34 has a bracket 35 for facilitating bolting of the feeder 10 to the forehearth 12. Wall 36 has a similar bracket 37. Housing 32 has a straight vertically disposed front wall 38 connected to the side walls 34, 36 by angularly disposed bevels 40, 41. A plurality of brackets 42 are secured to the upper edge of the front and side walls of the housing 32 to facilitate bolting of the roof structure 32 thereto.

Figure 2:
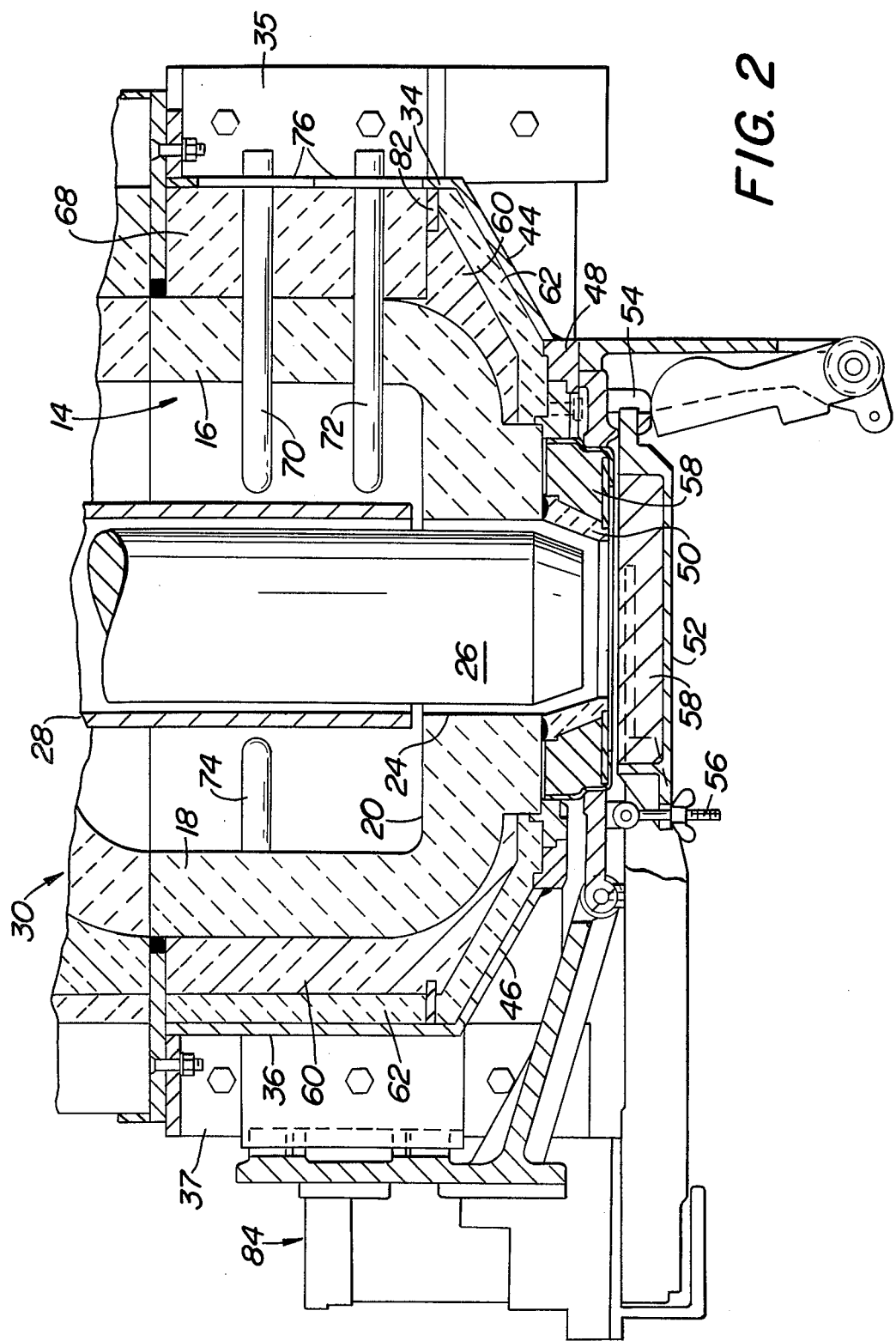
FIG. 2 is a sectional view taken along the line 2—2 in FIG. 1.

As shown more clearly in FIG. 2, the housing 32 has angled walls 44 and 46 converging downwardly and inwardly to a bottom ring 48. Bottom ring 48 supports a conventional orifice ring 50 of refractory material and surrounded by insulation 58 such as diatomaceous earth. In the illustrated embodiment, a single plunger with a single orifice ring are illustrated. The arrangement can alternatively receive corresponding structure for double gob or triple gob.

As shown in FIG. 2, a pivotable cover 52 is provided in its closed position. Cover 52 includes insulation 58 such as diatomaceous earth and is hinged at hinge 54. A fastener 56 is provided for molding the cover 52 in a closed disposition.

Between the outer periphery of the bowl 14 and the inner periphery of the housing 32, there is provided insulation adapted to withstand temperatures up to about 2300° F. The insulation is preferably in at least two forms such as a layer of insulation 60 and a surrounding layer 62. The layers of insulation may include bulk fiber insulation for the layer 60 and compressed fibers for the layer 62. Suitable fibers are well known to those skilled in the art and include fibers such as rock wool.

At a plurality of locations around the bowl 14, in place of the insulation there is provided a refractory block 68 which has been predrilled with at least one hole and in some cases with two holes, one above the other. See FIG. 2. The refractory blocks 68 are positioned at predetermined locations where it is desired to have electrodes for heating the molten glass within the bowl 14. As shown in FIG. 2, electrodes 70, 72 are disposed one above the other and extend through aligned holes in the side wall 16 of bowl 14, in the insulation block 68, and in the side wall 34 of the housing 32. Each of the electrodes 70, 72 has an enlarged flange 76 received in a hole of corresponding size in the side wall 34 of the housing 32.

As will be apparent from FIG. 1, the electrodes 70, 72 are disposed one above the other. As will be apparent from FIGS. 1 and 2, electrodes 74 and 74' are axially aligned and project through aligned holes in side walls of the bowl 14, a refractory block, and a hole in the side walls of the housing 32. Each electrode is at an elevation above the elevation of the bottom wall 20 of the bowl 14.

As shown more clearly in FIG. 1, the front wall of the feeder 10 may be provided with one or more electrodes which are perpendicular to the longitudinal axes of the electrodes on the side wall of the feeder 10. As a result of the fact that the walls of the feeder 10, which are to receive electrodes, being straight and parallel or perpendicular to each other, the electrodes will not be in a disposition wherein they converge. If the bowl were semicircular as shown in the above-mentioned patent, the electrodes would converge and create heat spots.

The electrode 78 on the front wall of the feeder 10 extends through aligned holes in the front wall 22 of the bowl 14, in a refractory block 80 comparable to the block 68, and a hole in the front wall 38 of the housing 32. Electrode 78 has a similar flange as described above. Another electrode may be provided in the front wall of the feeder 10 on the opposite side of the center line at location B in the same manner as electrode 78. If desired, a still further electrode may be provided immediately below either one or both of the electrodes in front wall 38.

A shelf 82 extends inwardly from the inner periphery of the housing 32 at about the elevation of the top surface of bottom wall 20 of the bowl 14. The shelf 82 supports the refractory blocks 68, 80, etc. at the proper elevation so that holes in said refractory blocks will be at a proper elevation for alignment with holes in the bowl 14 and housing 32.

The shear mechanism 84 of conventional construction is illustrated as extending to the left of the feeder 10 as shown in FIG. 1. Due to the differences in the arrangement of gob distributors and bottle forming machines with respect to the feeder in the same or different plants, the shear mechanism 84 must be positionable at any location around the feeder 10 from the position shown in FIG. 1 to a diagrammatically opposite position. Thus, the shear mechanism 84 may extend to the left of the feeder 10 as shown in FIG. 1, to the right of the feeder 10 diagrammatically opposite that shown in FIG. 1, or may extend perpendicular to the front wall of the feeder 10, or at any position therebetween.

The number and location of the electrodes will vary depending upon the position of the shear mechanism 84 with respect to the feeder 10. For example, if the shear mechanism 84 is perpendicular to the front wall of the feeder 10, it would interface with having electrodes in the front wall of the feeder 10. Hence, electrodes would not be provided in front wall 38 and when constructing the feeder 10, no holes would be drilled in the front wall 22 of the bowl 14. Instead, electrode 78 would be positioned so as to extend through the side wall of the feeder 10 at location A so as to be aligned with electrode 70.

The following arrangements of electrodes at or adjacent the front wall 38 are preferred: one or both of electrodes 70, 72 in combination with one or two electrodes in side wall 18 at location A and with no electrodes in front wall 38; electrode 78 and another electrode at location B with no electrodes at location A and no electrodes at the position of electrodes 70, 72; one or both of electrodes 70, 72 and electrode 78 with no electrodes at locations A and B; electrodes at locations A and B with no electrodes at the locations of electrodes 70, 72, 78. Electrodes 74, 74' are not effected by said alternative arrangements.

The housing 32 is preferably manufactured so as to have drilled holes at all possible locations for electrodes. Any location on the housing 32 which do not contain an electrode at the installation of the feeder will be plugged with a metal disk.

In use, a stream of molten glass will be discharged through the orifice ring at the desired rate. The stream will be cut into gobs by means of blades forming a part of the shear mechanism 84 in a conventional manner. The electrodes, which per se may be conventional electrical resistance heaters, are connected to a source of electric potential to provide localized heating of the molten glass for maintaining uniformity of the temperature of the molten glass within the bowl 14.

Each of the electrodes projects into the bowl 14 for a distance of $2\frac{1}{2}$ to 5 inches on a bowl 16 inches across. I prefer electrodes 74, 74' in the side walls to project inwardly for a distance of about 4 inches with electrodes 70, 72, 78, in or adjacent the front wall 38 projecting into the bowl 14 for a lesser distance such as 3 inches. Since the object is to attain uniform temperature distribution in the molten glass, the current density of the power connected to the electrodes is preferably selectively adjustable so that each dual set of electrodes (such as 70, 72) has a lower current density.

The electrodes are preferably installed without any external fasteners. If the electrodes have a diameter of $1\frac{1}{4}$ inches, the holes in the bowl 14 and the refractory blocks have a diameter of $1\frac{3}{8}$ inches whereby a small sleeve of solidified glass will hold the electrodes in place. The housing holes will be larger than the bowl holes. With bowl holes of $1\frac{3}{8}$ inches in diameter, the diameter of the housing holes would be 3 inches. Thus, it will be noted that the electrodes can be removed for whatever reason and replaced without disassembly of the housing with respect to the bowl by applying sufficient force to break the glass seal around the electrodes.

The present invention may be embodied in other specific forms without departing from the spirit or essential attributes thereof and, accordingly, reference should be made to the appended claims, rather than to the foregoing specification as indicating the scope of the invention.

I claim:

1. A molten glass feeder comprising a metal housing, a refractory bowl in said housing, insulation between said housing and bowl, said bowl having means defining a discharge orifice in the bottom wall of said bowl for discharge of glass therefrom, said bowl and housing having straight parallel side walls connected to a front wall, at least one electrode extending through aligned openings in said front or side walls of said bowl and housing at an elevation above the elevation of said bottom wall of said bowl, each electrode being perpendicular to the wall supporting the same, each electrode projecting into said bowl for electrically heating molten glass in said bowl, each electrode being removable outwardly along its longitudinal axis, said housing and bowl having two electrode holes in each of said front and side walls thereby defining six electrode positions, the number of electrode holes exceeding the number of electrodes, the electrode holes not containing an electrode being plugged, whereby the number and position of electrodes may be selectively varied.

2. A feeder in accordance with claim 1 wherein said electrodes are nonuniformly spaced from each other.

3. A feeder in accordance with claim 1 wherein said electrodes project into said bowl for a distance of about $2\frac{1}{2}$ to 5 inches.

4. A feeder in accordance with claim 1 including a discrete refractory block for each of the electrodes, each block being disposed between the outer periphery of the bowl front or side walls and the inner periphery of the housing front or side walls, respectively, each refractory block having at least one opening therethrough and through which the electrode extends.

5. A feeder in accordance with claim 4 including means defining a shelf on the inner periphery of the housing and extending toward the bowl, each block being supported at its lower end by said shelf.

6. A feeder in accordance with claim 1 wherein one of said front or side walls has a pair of electrodes disposed one above the other and parallel to each other.

7. A feeder in accordance with claim 1 wherein each electrode has a radially outwardly directed flange to facilitate mounting each electrode, each electrode flange being parallel to the housing wall supporting the same.

* * * * *